May 30, 1939.　　M. ALPERN　　2,160,612
HYDRAULIC TRANSMISSION
Filed Feb. 1, 1934　　3 Sheets-Sheet 1

Inventor
Maxwell Alpern
By [signature]
Attorney

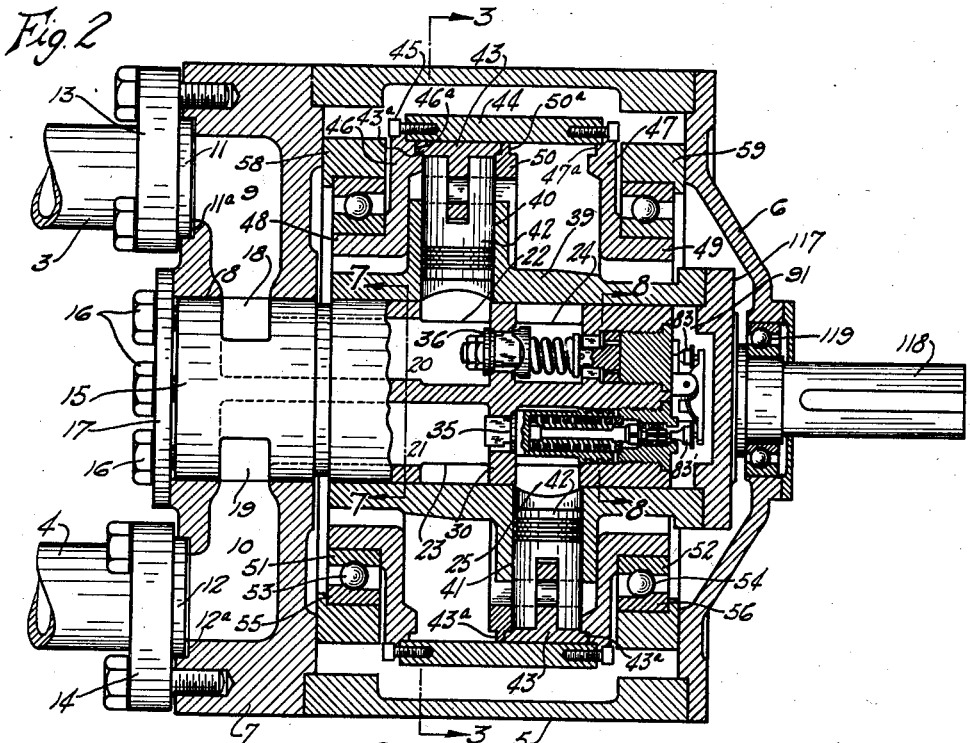
May 30, 1939. M. ALPERN 2,160,612
HYDRAULIC TRANSMISSION
Filed Feb. 1, 1934 3 Sheets-Sheet 2
Inventor
Maxwell Alpern
By Gerald Libbe
Attorney May 30, 1939.  M. ALPERN  2,160,612
HYDRAULIC TRANSMISSION
Filed Feb. 1, 1934  3 Sheets-Sheet 3
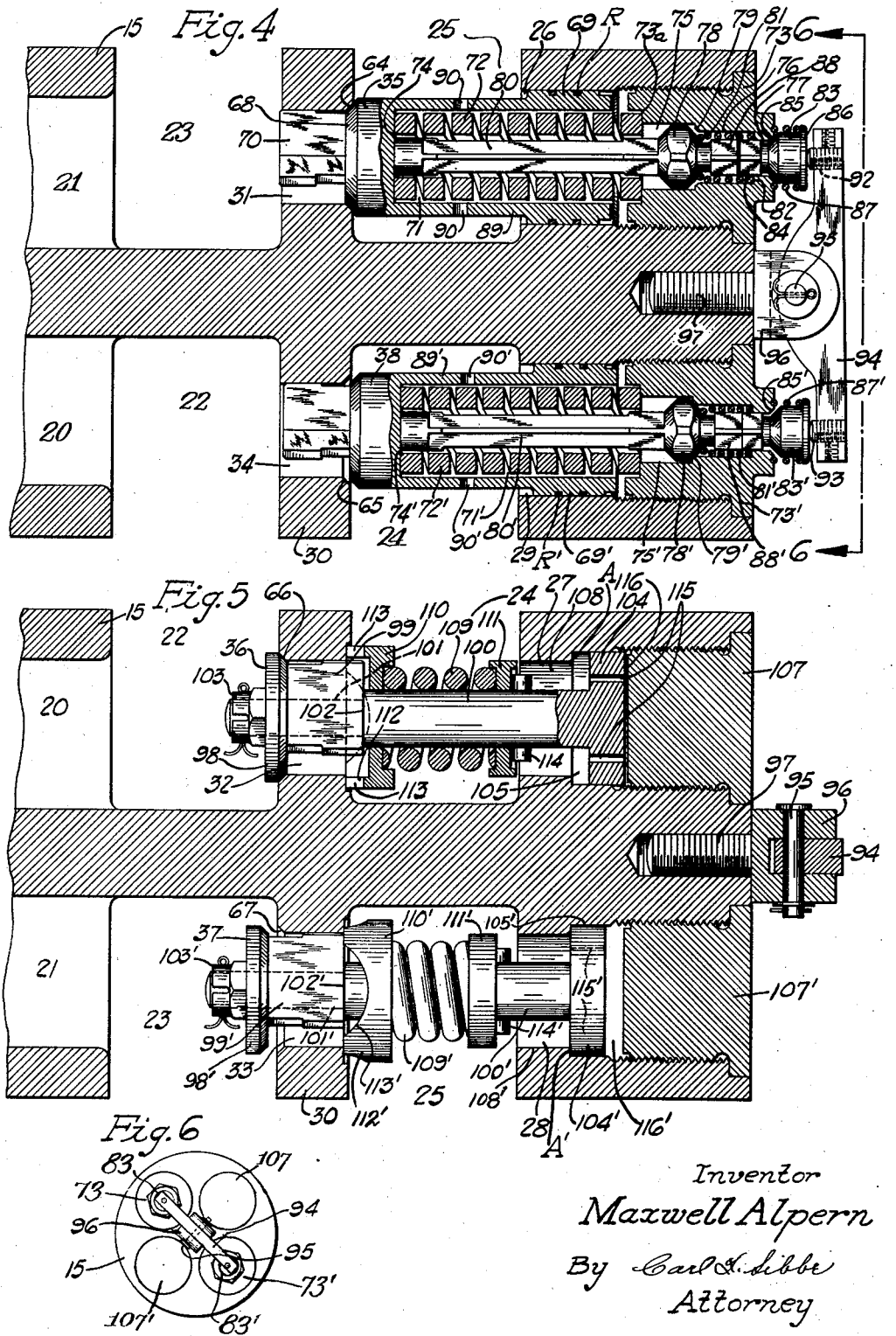
Inventor
Maxwell Alpern
By Carl A. Libbe
Attorney Patented May 30, 1939

2,160,612

UNITED STATES PATENT OFFICE 2,160,612

HYDRAULIC TRANSMISSION

Maxwell Alpern, Philadelphia, Pa., assignor to American Engineering Company, Philadelphia, Pa., a corporation of Pennsylvania Application February 1, 1934, Serial No. 709,284

19 Claims. (Cl. 121—60)

This invention relates generally to hydraulic transmissions, and more particularly to transmissions of the reversible, variable speed type.

One object of the present invention is to provide a transmission wherein the speed of operation and the torque thereof is controlled by the load to which it is subjected.

Another object is to provide an hydraulic transmission wherein the motor end thereof is provided with pressure operated valves to control the speed of operation and the driving torque thereof.

A more specific object is to provide a hydraulic motor in which the cylinder body thereof contains two rows or series of cylinders, one series being normally effective, while the other series being normally ineffective, and valve means interposed between said series of cylinders adapted to respond to the pressure in the system to render the ineffective series of cylinders effective when the pressure in the system reaches a predetermined value.

A further object is to provide a novel valve mechanism which functions to permit the escape of air and fluid leakage from the normally ineffective side of the motor when in ineffective condition, but which retains the fluid therein when the said normally ineffective side of the motor has been rendered effective.

Other and further objects will become apparent as the description of the invention progresses.

Of the drawings:

Fig. 2 is a sectional plan view taken longitudinally of the motor end of the hydraulic transmission, showing the arrangement of the operating parts thereof.

Fig. 3 is a sectional end view taken substantially along the line 3—3 of Fig. 2.

Fig. 4 is an enlarged sectional view of the central valve taken substantially along line 4—4 of Fig. 3.

Fig 5 is an enlarged sectional view of the central valve taken substantially along line 5—5 of Fig 3.

Fig. 6 is a reduced end view taken substantially along line 6—6 of Fig. 4.

Fig. 7 is a sectional view taken along line 7—7 of Fig. 2, and

Fig. 8 is a sectional view taken along line 8—8 of Fig. 2.

Figure 1:
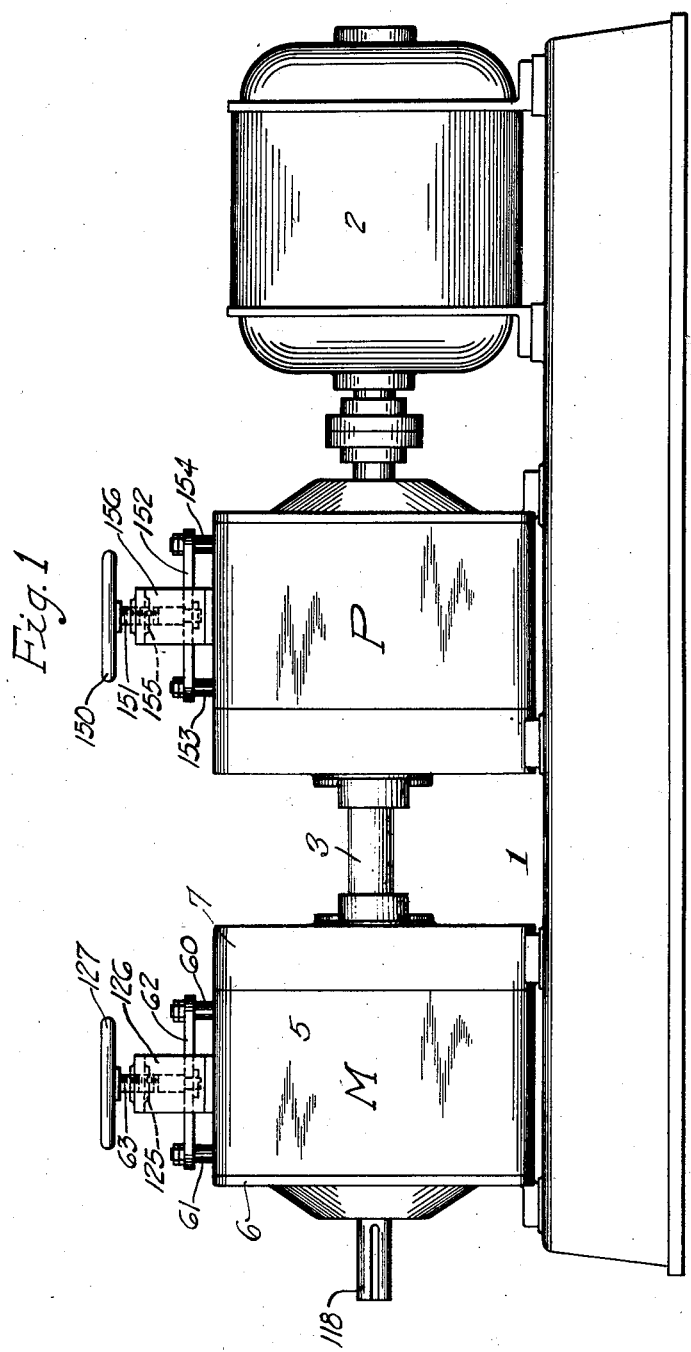
Fig. 1 is a side elevational view of the hydraulic transmission, and the motor means for driving the same.

Referring to the drawings, the numeral 1 designates generally an hydraulic transmission comprising a fluid motor M, driven by a pump P. The pump P may be driven by an electric motor 2, or by any other suitable driving means. The pump and motor are of the general variable stroke reversible discharge type shown and described in the United States Patent to Hele-Shaw No. 1,152,729, but inasmuch as the specific construction of the pump P forms no part of the present invention a detailed description thereof is unnecessary. The stroke and direction of discharge of pump P is regulated by means of a hand wheel 150 which has secured thereto a screw shaft 151, the lower end of which being rotatably secured to a bar 152. Bar 152 has secured to the opposite ends thereof rods 153 and 154, which in turn are connected to the sliding blocks (not shown) of the pump P. Screw shaft 151 extends through a fixed nut 155 secured to the upper end of a bracket 156 mounted on the top of pump P. It therefore is seen that the stroke and direction of discharge of the pump may be egulated by simply adjusting hand wheel 150. The fluid discharging from pump P is delivered to motor M through pipes 3 and 4.

Motor M in the present instance comprises a housing 5 to one end of which is secured, by any suitable means, a cover plate 6. The other end of the housing 5 has secured thereto a heavy casting 7 provided with a central tapered bore 8 and passages 9 and 10. As shown in Fig. 2, the pipes 3 and 4 are formed with flanges 11 and 12, which seat in annular recesses 11ᵃ and 12ᵃ respectively, provided in the casting 7 near the outer ends of passages 9 and 10, and a pair of recessed plates 13 and 14 bolted to casting 7 engage the flanges 11 and 12, respectively, and thus rigidly secure the pipes 3 and 4 to said casting. Mounted within the housing 5 is a main central valve 15 which is secured at one end in the central bore 8 of casting 7. Central valve 15 is drawn snugly into the bore 8 by bolts 16, the heads of which bear against a circular plate 17 which, as shown in Fig. 2, abuts against an annular boss provided on casting 7. The end of the central valve 15 is tapered to conform with the bore 8, thus when the valve has been secured in position, longitudinal movement thereof is prevented. Rotary movement of the valve is also prevented due to frictional contact between the valve and bore, and also between plate 17 and casting 7.

As shown in Fig. 2, valve 15 near the left hand end thereof is provided with a pair of ports 18 and 19, which communicate with the passages 9 and 10, respectively, and also with two pairs of passages 20, 20, and 21, 21, respectively, which extend longitudinally of central valve 15. The right hand end of passages 20, 20, and 21, 21 communicate with ports 22 and 23, respectively. In valve 15 and located adjacent to ports 22 and 23 are a second pair of ports 24 and 25, which communicate with passages 27, 29, and 26, 28, respectively, the latter of which extend longitudinally of the valve 15 from ports 24 and 25 to the right hand end thereof. The ports 22, 23, and 24, 25 are separated by a transverse partition 30 having four openings or passages 31, 32, 33 and 34 provided therein. These openings are normally closed by valves 35, 36, 37 and 38 which are guided for movement in passages 31, 32, 33 and 34, respectively. The construction and operation of these valves will be fully described hereinafter.

Journaled on central valve 15 within the housing 5 is a rotary cylinder body 39 comprising two rows or series of cylinders 40 and 41. Cylinders 40 communicate with ports 22 and 23, while the cylinders 41 communicate with ports 24 and 25 of the central valve 15 as said body rotates in the housing. A piston 42 is provided in each cylinder and has pivotally connected to the outer end thereof a slipper 43, slidably secured against the inner face of a floating ring 44. The floating ring 44 is secured by bolts 45 to a pair of spaced annular discs 46 and 47, having outwardly extending cylindrical flanges 48 and 49, respectively, provided thereon. An annular ring 50 is secured to the inner surface of floating ring 44 midway between the side edges thereof. Discs 46, 47, and ring 50 are provided with annular recesses 46a, 47a and 50a respectively around the outer peripheries thereof for receiving the reduced side edges 43a of the slippers 43 whereby the latter are held against lateral movement. The outer peripheries of the flanges 48 and 49 of discs 46 and 47, respectively, have secured thereto rings 51 and 52, which form the inner race for ball bearings 53 and 54, and rings 55 and 56 forming the outer race for said bearings, are secured to non-rotatable sliding blocks 58 and 59. A pair of rods 60 and 61 secured at one end to the sliding blocks 58 and 59, respectively, extend through bearings provided in housing 5, and are connected for simultaneous movement by a bar 62 having a screw shaft 63 rotatably secured thereto intermediate its ends. Screw shaft 63 extends through a nut 125 fixed to the upper end of a bracket 126 mounted on motor M and has secured to the upper end thereof a hand wheel 127. It therefore is seen that upon manipulation of hand wheel 127 the strokes of all of the pistons 42 may be simultaneously adjusted. If it is desired to retain the pistons 42 on a fixed stroke the sliding blocks 58 and 59 may be secured in position by any suitable means. In such cases the hand wheel 127 and associated parts may be dispensed with.

Referring more particularly to Figs. 2, 4 and 5, it will be observed that valves 35 and 38 normally seat upon valve seats 64 and 65, respectively, provided at the right hand side of partition 30, adjacent openings 31 and 34, while valves 36 and 37 normally seat upon valve seats 66 and 67, respectively, provided at the left hand side of said partition adjacent openings 32 and 33. Valves 35 and 38 are identical in structure and operation so that a detail description of one will suffice for both. Valves 36 and 37 are also identical in structure and operation.

Valve 35 is substantially cylindrical in form and comprises a tapered head portion 68 which normally engages valve seat 64, and an enlarged portion 69 which fits snugly in passage 26. Secured to the end of head portion 68 of valve 35 is a substantially Y-shaped guide member 70. As shown in Figs. 2 and 4, guide member 70 extends through opening 31 of partition 30 and engages the wall thereof, thereby insuring proper seating of the valve. Valve 35 is provided with a cylindrical chamber 71 extending inwardly from the right hand end thereof for receiving a coil spring 72, the purpose of which will presently appear. The right hand end of passage 26 is provided with internal threads for receiving a tubular plug 73. The left hand end of plug 73 is provided with an annular recess 73a for receiving one end of spring 72, the other end of which abuts the inner wall 74 of chamber 71. The interior of plug 73 is provided with three communicating chambers 75, 76 and 77, of varying diameters, extending from left to right thereof. Chamber 75 has provided therein a valve 78 which is adapted to engage a valve seat 79 provided at the right hand end of said chamber. Valve 78 has secured thereto one end of an elongated valve stem 80, the other end of which abuts against the wall 74 at the end of chamber 71. A coil spring 81 extends between valve 78 and an annular shoulder 82 provided between chambers 76 and 77, which tends to unseat valve 78 and maintain the end of valve stem 80 in engagement with wall 74. A second valve 83 is provided at the right hand end of plug 73 in axial alignment with valve 78 and is guided for reciprocation in chamber 77 by a triangular-shaped guide member 84. Valve 83 is adapted to engage a valve seat 85 provided at the right hand end of plug 73 adjacent chamber 77 and is provided with an annular flange 86. A coil spring 87 surrounds valve 83 and extends between the end of plug 73 and the annular flange 86. Spring 87 functions to unseat valve 83 when valves 35 and 38 are in normal seated position, as will presently appear. Integral with valve 78 and extending to the right thereof, is a substantially triangular abutment member 88 which is adapted to engage guide member 84 associated with valve 83 to unseat the latter when valve 35 is moved to the right. As shown in Fig. 4, when valve 83 is urged against its seat 85 the end of guide member 84 is spaced slightly from the end of abutment member 88, thereby providing a slight lost motion connection therebetween. The reduced portion 89 of valve 35 is provided with apertures 90 through which fluid and air from port 25 may enter the chamber 71. It therefore is seen that when the valves 78 and 83 are unseated this fluid and air may flow through the interior of valve 35 and plug 73, and discharge into the chamber 91 provided at the right hand end of central valve 15. However, when either of the valves 78 or 83 is seated the passage of fluid therethrough is prevented.

The end of passage 29 also has provided therein a tubular plug 73' and a valve 83', similar in construction to the plug 73 and valve 83, respectively, just described. Valves 83 and 83' are retained in position by studs 92 and 93, respectively, mounted in the ends of a lever 94. Lever 94 is pivoted intermediate its ends on a pin 95 mounted in a clevice 96 secured by a bolt 97 to the end of central valve 15, as shown in Figs. 4 and 5. By the construction just described, it is seen that in case valve 38 is moved to the right the valve 78' associated therewith will engage its valve seat 79'. At the same time, the abutment member 88' secured to the right hand end thereof will actuate valve 83' to the right, which in turn swings lever 94 in a counter-clockwise direction (Fig. 4) to move valve 83 to the left against its seat. Fig. 4 shows the parts in this position. When the valve 38 is returned to operative position against its seat 65 by its spring 72' the spring 87 associated with valve 83 will urge the latter to the right, thereby unseating the same. Lever 94 will also be swung slightly in a clockwise direction causing valve 83' to move slightly to the left. Valves 83 and 83' will now be held in unseated position by their respective springs 87 and 87'. When the valve 38 has been restored to normal position, as just described, valve 78' will be urged to the left away from its seat by spring 81' and the end of valve stem 80' will be maintained against the inner wall 74' of chamber 71'.

It is also clear that when valve 35 is moved to the right, valve 78 will move against its seat 79 and the abutment member 88 secured thereto will move valve 83 to the right, causing lever 94 to swing in a clockwise direction to seat valve 83'. The parts will remain in this position until valve 35 is moved to the left against its seat 64, when spring 87' unseats valve 83' and swings lever 94 in a counter-clockwise direction. Spring 81 will now move valve 78 to the left, away from its seat 79, and will maintin the end of valve stem 80 in abutting relation with the wall 74 of chamber 71. The reduced portion 89' of valve 38 is also provided with apertures 90' through which fluid and air from port 24 may enter chamber 71' and thence be discharged to chamber 91 through the interior of plug 73' past valves 78' and 83', respectively. Piston rings R and R' are provided in the enlarged portions 69 and 69' of valves 35 and 38, respectively, to insure a snug fit thereof in their respective passages 26 and 29. The tension of springs 72 and 72' may be varied by simply adjusting the position of their respective plugs 73 and 73'.

Referring more particularly to Fig. 5, valve 36 comprises a valve head 98 of the mushroom type, having integral therewith a substantially triangular guide member 99 which extends through opening 32 and engages the wall thereof at spaced points, and a valve stem 100 which extends into passage 27. Valve head 98 and guide member 99 are bored centrally thereof to receive the reduced portion 101 of valve stem 100. The reduced portion of valve stem 100 provides an annular shoulder 102 which abuts the inner end of guide member 99 and lock a nut 103 provided on the projecting end thereof secures the parts in position, as shown in Fig. 5. The right hand end of valve stem 100 terminates in an enlarged portion 104 which fits snugly in the enlarged portion 105 of passage 27, the end of the latter being provided with internal threads for receiving the threaded end of a plug 107. When valve 36 is seated the right hand end of portion 104 is spaced slightly from the inner end of plug 107, thus forming a chamber 116 therebetween. Passage 27 is also provided with a reduced portion 108 which provides an annular shoulder A adapted to be engaged by enlarged portion 104 when valve 36 is moved to the left thereby limiting the outward travel of said valve. Valve 36 is normally held on its seat 66 by a coil spring 109 which surrounds valve stem 100 and extends between a pair of spring seats 110 and 111. Spring seat 110 is loosely mounted on valve stem 100 and is provided with an annular flange 112, the end of which seats in a recess formed in partition 30 adjacent the right hand side of opening 32. Flange 112 is provided with a series of recesses 113 which permit the passage of fluid from port 24 to port 22 through opening 32 when valve 36 is open, as will appear hereinafter. Spring seat 111 is also loosely mounted on valve stem 100 and is held in position by a pin 114 suitably mounted in said valve stem. It therefore is seen that in order to unseat valve 36 pressure must be exerted thereon sufficient to overcome the tension of spring 109. The enlarged portion 104 of valve 36 is provided with a series of ports 115 which establish communication between the chamber 116 and port 24. Thus when port 24 is subjected to pressure, as will presently appear, owing to the fact that the combined areas of the right hand ends of valve head 98, guide member 99, and enlarged portion 104 are greater than that of the left hand ends of said enlarged portion and valve head, the latter of which being subjected to pressure in port 22, valve 36 will move to the left away from its seat 66 when the differential in pressure exceeds the tension of spring 109. Ports 115 also prevent the fluid leaking past the outer peripheries of enlarged portion 104 from being trapped in chamber 116 and thus insure proper seating of valve 36. As pointed out before, valve 37 is identical to valve 36 and also comprises a valve head 98' having a substantially triangular guide member 99' secured thereto and extending through opening 33, and a valve stem 100' which extends into passage 28. Valve head 98' and guide member 99' are bored centrally thereof to receive the reduced portion 101' of valve stem 100'. The reduced portion 101' of valve stem 100' provides an annular shoulder 102', which abuts the inner end of guide member 99', and a lock nut 103' provided on the projecting end thereof secures the parts in position, as shown in Fig. 5. The right hand end of valve stem 100' terminates in an enlarged portion 104' which fits snugly into the enlarged portion 105' of passage 28. The outer end of passage 28 is threaded, and receives the threaded end of a plug 107'. When valve 36 is seated the right hand end of enlarged portion 104' is spaced slightly from the inner end of plug 107', thus forming a chamber 116' therebetween. Passage 28 is also provided with a reduced portion 108' which provides an annular shoulder A' adapted to be engaged by enlarged portion 104' when valve 37 is moved to the left, thereby limiting the outward travel of said valve. Valve 37 is normally held on its seat 67 by a coil spring 109' which surrounds valve stem 100' and extends between a pair of spring seats 110' and 111'. Spring seat 110' is loosely mounted on valve stem 100', and is provided with an annular flange 112', the end of which seats in a recess formed in partition 30 adjacent the right hand side of opening 33. Flange 112' is provided with a series of recesses 113' which permits the passage of fluid from port 25 to port 23 through opening 33 when the valve is open, as will appear more fully hereinafter. Spring seat 111' is also loosely mounted on valve stem 100', and is held in position by a pin 114' suitably mounted in said valve stem. It therefore is seen that in order to unseat valve 37 pressure must be exerted thereon sufficient to overcome the tension of spring 109'. The enlarged portion 104' of valve 37 is also provided with a series of ports 115' which establish communication between the chamber 116' and port 25. Thus, when port 25 is subjected to pressure, valve 37 will move to the left, away from its seat when the pressure acting thereon is sufficient to overcome the tension of spring 109', as previously described, in connection with valve 36.

The operation of the device just described will now be briefly summarized. The strokes of pistons 42 are first adjusted the desired amount by manipulating hand wheel 127. This causes movement of sliding blocks 58 and 59, and consequently of floating ring 44. In devices of this kind it is well known that when the floating ring is concentric with the central valve no movement is imparted to the cylinder body when the pistons therein are subjected to pressure. However, when the floating ring is moved to a position eccentric to the central valve the force of the fluid acting on the pistons will tend to force the latter outwardly, and by virtue of the pivotal connection of the slippers with the pistons, and the eccentricity of the floating ring with respect to the central valve, the slippers ride on the inclined plane thus established, and the force of the fluid imparted to the pistons causes a rotary movement of the cylinder body. For a given amount of fluid supplied to motor M by pump P, the speed of operation of the former depends upon the ability of its pistons to discharge the fluid so delivered. Thus, the greater the stroke the slower will be the speed of operation of the associated cylinder body, and vice versa. Let us now assume that the sliding blocks 58 and 59 have been moved upwardly the desired amount, thereby causing piston 42 to move away from ports 23 and 25 and towards ports 22 and 24, as the cylinder body 39 rotates about central valve 15, and that pump P has been adjusted by hand wheel 150 so as to deliver fluid under pressure to pipe 4 and suction to pipe 3. When the valves 35, 36, 37 and 38 are seated, fluid can only be supplied to cylinders 40 of the cylinder body 39. Thus all of the fluid supplied to motor M by pump P must be discharged by this row of cylinders, and consequently the cylinder body will be rotated at a comparatively high rate of speed.

Inasmuch as the stroke of pistons 42, operating in cylinders 41, have also been adjusted, suction will be applied to port 25 and pressure to port 24, and if communication was not established between these ports and the chamber 91 to the right of central valve 15, due to this force, fluid may be drawn into port 25 from port 23 past valve 35. Also, the pressure applied to port 24 by pistons 42 would have a tendency to unseat valve 36, thereby creating an undesirable condition. However, since valves 78 and 83 associated with valve 35, and valves 78' and 83' associated with valve 38, are normally unseated, when suction is applied to port 25 by pistons 42, air may be drawn into said port from chamber 91 and deposited in port 24. It then may escape through chamber 71' and past valves 78' and 83' back into chamber 91. Thus any undesirable effects caused by the operation of the pistons 42 associated with cylinders 41 when the latter are not subjected to pressure, are eliminated.

As the load imposed upon the motor is increased, the pressure of the fluid delivered thereto increases and when this pressure reaches a predetermined value, as regulated by the tension of spring 72 of valve 35, the latter will unseat and fluid will then flow from port 23 through opening 31 to port 25 and will then enter cylinders 41 under pressure and be deposited into port 24 by pistons 42. The pressure in port 24 soon exceeds the tension of spring 109 and when the differential pressures acting against the right and left hand side of valve 36 exceed the tension of spring 109 valve 36 will move to the left away from its seat, and the fluid delivered to port 24 will now flow into port 22 through recesses 113 and opening 32.

Cylinders 41 will now receive a portion of the fluid supplied to the motor M by the pump with the result that the speed of the motor will decrease but a greater torque will be delivered thereby. If the cylinders 41 are of the same capacity as cylinders 40, the speed of operation of the motor is reduced by one-half when the valves 35 and 36 are thus opened. Upon movement of valve 35 in this manner valve 78 is urged against its seat 79, thereby preventing the escape of fluid from port 25 to chamber 91. This movement is imparted to lever 94 which rocks in a clockwise direction (Fig. 4) urging valve 83' against its seat 85' and thereby also preventing fluid delivered to port 24 to escape past valve 83' and into chamber 91. Therefore it is seen that when the pressure exceeds the tension of spring 72 of valve 35 fluid entering the motor through pipe 4 will circulate through ports 23 and 25 and thence to ports 24 and 22, and back to the pump through pipe 3. When the load imposed upon the motor falls below a predetermined value the pressure delivered by the pump will also decrease, and when the pressure falls below the tension of spring 72 the latter will urge valve 35 against its seat. When this occurs communication is cut off between ports 23 and 25, causing the pressure in port 24 also to decrease, and when this pressure falls below the tension of spring 109 associated with valve 36 it will urge said valve upon its seat 66. The motor will now increase in speed inasmuch as all of the fluid delivered by the pump must now be discharged by the cylinders 40. When valve 35 has been returned to normal seated position by its spring 72, spring 87' associated with valve 83' will urge the latter to the right away from its seat 85'. This movement is imparted to lever 94 causing the latter to rock slightly in a counter-clockwise direction, thereby moving valve 83 slightly to the left. Springs 87 and 87' will now retain their associated valves 83 and 83' respectively, in unseated position. At the same time spring 81 will urge valve 78 to the left away from its seat 79, bringing the end of valve stem 80 into abutting relation with the end wall 74 of chamber 71. The same procedure follows in the event that the pump is delivering fluid pressure to pipe 3 and suction to pipe 4. In this case when the pressure delivered thereby exceeds the tension of spring 72' associated with valve 38, the latter will be moved away from its seat 65, as shown in Fig. 4, bringing valve 78' into engagement with its seat 79'. At the same time lever 94 will be rocked in a counterclockwise direction to urge valve 83 against its seat 85. When the pressure delivered to port 25 exceeds the tension of spring 109' valve 37 will be moved to the left away from its seat 67, and fluid will now circulate from port 22 to port 24, thence to cylinders 41 and be deposited into port 25 from which it will circulate into port 23 and flow through passages 21, 21, and be returned to the pump through pipe 4.

Referring to Fig. 2, the cylinder body 39 has secured to the right hand end thereof by any suitable means a disc 117 secured to a drive shaft 118. Drive shaft 118 operates in ball bearings 119 provided in end plate 6. Any form of transmission mechanism may be connected to shaft 118.

It therefore is seen that a very flexible device has been provided, which is especially adapted for use in connection with winches or other devices where changes in speed and torque are desired. For example, in case the invention is applied to a mooring which, it is desirable to operate the winch at high speeds to take up the slack in the cable or to effect mooring as quickly as possible if the effort is comparatively small. However, in case a heavy load should be imposed upon the apparatus a greater torque and a slower speed of operation is immediately obtained. It is also apparent that different speeds may be obtained at comparatively low pressures by simply regulating the tension of the springs associated with the control valves. This feature may be highly desirable in case the invention is employed to drive, for example, tables of machine tools, such as planers, wherein a comparatively slow work stroke and a quick return stroke are desirable.

The invention has been applied to the type of fluid motor wherein the cylinder body rotates about a central valve, only for the purpose of illustration, it being apparent that it may be applied, with slight modification, to motors wherein the main valve is located exterior to the cylinder and in general, to all types of rotary fluid motors having two or more rows or series of cylinders which are subjected to fluid pressure through a common main valve. It therefore is to be understood that only such limitations shall be imposed thereon as are indicated by the appended claims or as are demanded by the prior art.

What is claimed is:

1. A reversible fluid motor comprising, a stationary central valve, a cylinder body having a plurality of series of cylinders rotatably mounted on said valve, a piston operating in each of the cylinders of each of said series, means provided in said central valve for rendering effective or ineffective one of said series of cylinders during rotation of said motor in one direction, and additional means provided in said central valve for rendering effective or ineffective the said one series of cylinders during rotation of said motor in the reverse direction.

2. A reversible fluid motor, comprising a stationary central valve, and a cylinder body rotatably mounted on said valve, said cylinder body comprising two series of cylinders, a piston operating in each of the cylinders of each of said series, means for normally rendering one of said series of cylinders ineffective, and fluid means for rendering said last mentioned means ineffective when the pressure in the system exceeds a predetermined value, during rotation of said motor in either direction.

3. A reversible fluid motor comprising, a main distributing valve and a cylinder body operatively associated with said valve, said cylinder body having a normally effective series of cylinders and a normally ineffective series of cylinders, a piston operating in each of the cylinders of each of said series, automatically operable means for rendering effective said normally ineffective series of cylinders during operation of said motor in one direction, and additional automatically operable means for rendering effective said normally ineffective series of cylinders during rotation of said motor in the reverse direction, when the pressure of the fluid driving said motor exceeds a predetermined value.

4. A reversible, variable speed fluid motor comprising, a stationary central valve, and a cylinder body rotatably mounted on said valve, said cylinder body having a plurality of series of cylinders, a piston operating in each cylinder of each of said series, automatically operable valve means for rendering one of said series effective or ineffective, depending upon the pressure of the fluid driving said motor, during operation of said motor in one direction, and additional automatically operable valve means for rendering the said one of said series effective or ineffective, depending upon the pressure of the fluid driving said motor, during operation of said motor in the reverse direction.

5. A reversible variable speed fluid motor, comprising a main valve and a cylinder body operatively associated therewith, said cylinder body having a plurality of series of cylinders, a piston operating in each cylinder of each of said series, valve means for normally rendering one of said series of cylinders ineffective, resilient means for retaining said valve means in operative position, and fluid means for rendering said valve means inoperative when the pressure in the system exceeds a predetermined value, during operation of said motor in either direction.

6. A reversible variable speed fluid motor, comprising a main valve, and a cylinder body operatively associated therewith, said cylinder body having a plurality of series of cylinders, a piston operating in each cylinder of each of said series, spring urged valve means for normally rendering one of said series of cylinders ineffective, fluid means for actuating said valve means to inoperative position when the pressure in the system exceeds the tension of said spring during operation of said motor in either direction, and means for adjusting the tension of said spring.

7. A variable speed fluid motor, comprising a stationary central valve, and a cylinder body rotatably mounted on said valve, said cylinder body having a plurality of series of radially disposed cylinders, a piston operating in each cylinder of each of said series, a plurality of sets of ports in said central valve, one set of said ports communicating with each series of cylinders, a passage in said central valve through which fluid under pressure is supplied to said cylinders, a second passage in said valve for returning said fluid to the source of supply, partition means between said sets of ports, normally closed valve means provided in said partition whereby but one series of cylinders is normally effective, and fluid means for actuating said valve means to inoperative position when the pressure exceeds a predetermined value thereby rendering effective other of said series of cylinders.

8. A reversible fluid motor comprising, a stationary central valve, and a cylinder body rotatably mounted on said valve, said cylinder body having a plurality of series of cylinders provided therein, a piston operating in each cylinder of each of said series, means for adjusting the stroke of said pistons to vary the speed of said motor, automatically operable means for rendering effective or ineffective one of said series of cylinders, during operation of said motor in one direction, and additional automatically operable means for rendering effective or ineffective the said one of said series of cylinders, during operation of said motor in the reverse direction, to further vary the speed of said motor.

9. A variable speed fluid motor, comprising a stationary central valve and a cylinder body rotatably mounted on said valve, said cylinder body having a normally effective series of cylinders, and a normally ineffective series of cylinders, a piston operating in each of the cylinders of each of said series, valves provided in said central valve between said series of cylinders, spring means for normally retaining said valves in closed position, auxiliary valves mounted in said central valve in operative relation with said ineffective series of cylinders, and means operatively connecting said auxiliary valves to said valves first named, whereby upon operation of said first named valves to open position, said auxiliary valves will be closed to prevent the escape of fluid therethrough.

10. A variable speed fluid motor, comprising a main stationary valve and a cylinder body rotatably mounted thereon, said cylinder body having a plurality of rows or series of cylinders, a piston operating in each cylinder of each of said series, one of said series of cylinders being normally effective, and another of said series being normally ineffective, valve means provided in said central valve between said normally effective and normally ineffective series of cylinders, means operated by the pressure delivered to said normally effective series of cylinders for rendering said valves ineffective, thereby causing said normally ineffective series of cylinders to be rendered effective, additional valve means provided in said central valve in operative relation with said normally ineffective series of cylinders, said last mentioned valve means being normally open to permit the escape therethrough of air and fluid leakage, and means connecting said last mentioned valve means with said first mentioned valve means, whereby when the latter is operated to render said ineffective series of cylinders effective, the last mentioned valve means will be closed thereby preventing the escape therethrough of fluid delivered to said normally ineffective series of cylinders.

11. A reversible fluid motor, comprising a relatively movable main valve and cylinder body, said cylinder body having two series of cylinders provided therein, a piston operating in each of the cylinders of each of said series, passages in said main valve for delivering fluid to said cylinders from a source of supply, and for returning the fluid discharging from said cylinders back to said source of supply, and means provided in each of said passages for controlling the flow of fluid to one of said series of cylinders during rotation of said motor in either direction.

12. A reversible fluid motor, comprising a stationary central valve, and a cylinder body having two series of cylinders rotatably mounted on said valve, a piston operating in each of the cylinders of each of said series, passages in said central valve for delivering fluid pressure to said cylinders from a source of supply and for returning the fluid discharging from said cylinders back to said source of supply, and means provided in each of said passages for controlling the flow of fluid to one series of cylinders during operation of said motor in either direction.

13. A reversible fluid motor comprising a stationary central valve and a cylinder body having two series of cylinders rotatably mounted on said valve, a piston operating in each of the cylinders of each of said series, passages in said central valve for delivering fluid pressure to said cylinders from said source of supply and for returning the fluid discharging from said cylinders back to said source of supply, valve means provided in each of said passages for controlling the flow of fluid to one of said series of cylinders during operation of said motor in either direction, and means for actuating said valves in accordance with the pressure conditions of the fluid driving said motor.

14. A reversible fluid motor, comprising a stationary central valve and a cylinder body rotatably mounted on said valve, said cylinder body comprising two series of cylinders, a piston operating in each of the cylinders of each of said series, passages provided in said central valve for delivering fluid pressure to said cylinders from a source of supply and for returning the fluid discharging from said cylinders back to said source of supply, valve means provided in each of said passages for normally rendering one of said series of cylinders ineffective, and means for rendering said valve means ineffective when the pressure in the system exceeds a predetermined value, during operation of said motor in either direction.

15. A reversible fluid motor, comprising a stationary central valve and a cylinder body rotatably mounted on said valve, said cylinder body comprising two series of cylinders, a piston operating in each of the cylinders of each of said series, passages provided in said central valve for delivering fluid pressure to said cylinders from a source of supply and for returning the fluid discharging from said cylinders back to said source of supply, valve means provided in each of said passages for normally rendering one of said series of cylinders ineffective, means for rendering said valve means ineffective when the pressure in the system exceeds a predetermined value, during operation of said motor in either direction, auxiliary valves operatively associated with said normally ineffective series of cylinders through which air and fluid leakage may discharge, and means for closing said auxiliary valves when said normally ineffective series of cylinders is rendered effective.

16. A variable speed fluid motor, comprising a stationary central valve, and a cylinder body rotatably mounted on said valve, said cylinder body comprising a normally effective series of cylinders and a normally ineffective series of cylinders, a piston operating in each of the cylinders of each of said series, valves provided in said central valve between said series of cylinders, spring means for normally retaining said valves in closed position, auxiliary valves mounted in said central valves in operative relation with said inoperative series of cylinders, means operatively connecting said auxiliary valves to said valves first named whereby upon operation of said first named valves to open position said auxiliary valves will be closed to prevent the escape of fluid therethrough, and an automatically operable means for actuating said valves first named.

17. A variable speed fluid motor, comprising a stationary central valve and a cylinder body rotatably mounted on said valve, said cylinder body comprising a normally effective series of cylinders and a normally ineffective series of cylinders, a piston operating in each of the cylinders of each of said series, valves provided in said central valve between said series of cylinders, spring means for normally retaining said valves in closed position, auxiliary valves mounted in said central valves in operative relation with said inoperative series of cylinders, means operatively connecting said auxiliary valves to said valves first named whereby upon operation of said first named valves to open position said auxiliary valves will be closed to prevent the escape of fluid therethrough, and fluid means for actuating said first named valves.

18. A variable speed fluid motor, comprising a stationary central valve and a cylinder body rotatably mounted on said valve, said cylinder body having a plurality of series of radially disposed cylinders, a piston operating in each cylinder of each of said series, a plurality of sets of ports in said central valve, one set of said ports being provided for each series of cylinders, a passage in said central valve through which fluid under pressure is supplied to said cylinders, a second passage in said valve for returning said fluid to the source of supply, partition means between said sets of ports, intake and discharge ports provided in said partition, valves normally closing said ports whereby but one series of cylinders is normally effective, and automatic means for actuating said valves to open position when the pressure of the fluid exceeds a predetermined value thereby rendering effective the other of said series of cylinders.

19. A variable speed fluid motor, comprising a stationary central valve and a cylinder body rotatably mounted on said valve, said cylinder body having a plurality of series of radially disposed cylinders, a piston operating in each cylinder of each of said series, a plurality of sets of ports in said central valve, one set of said ports being provided for each series of cylinders, a passage in said central valve through which fluid under pressure is supplied to said cylinders, a second passage in said valve for returning said fluid to the source of supply, partition means between said sets of ports, intake and discharge ports provided in said partition, valves normally closing said ports whereby but one series of cylinders is normally effective, automatic means for actuating said valves to open position when the pressure of the fluid exceeds a predetermined value thereby rendering effective the other of said series of cylinders, auxiliary valves operatively associated with said normally ineffective series of cylinders through which air and fluid leakage may discharge, and means for closing said auxiliary valves when said normally ineffective series of cylinders is rendered effective.

MAXWELL ALPERN.